US012374839B2

(12) United States Patent
Henrici et al.

(10) Patent No.: US 12,374,839 B2
(45) Date of Patent: Jul. 29, 2025

(54) TWO-PIECE LED CONNECTION ELEMENT

(71) Applicant: BJB GmbH & Co. KG, Arnsberg (DE)

(72) Inventors: Philipp Henrici, Arnsberg (DE); Olaf Baumeister, Sundern (DE); Mark Weber, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 18/901,007

(22) Filed: Sep. 30, 2024

(65) Prior Publication Data

US 2025/0112423 A1 Apr. 3, 2025

(30) Foreign Application Priority Data

Oct. 2, 2023 (DE) ..................... 20 2023 105 716.0
Feb. 19, 2024 (DE) ..................... 10 2024 104 504.3

(51) Int. Cl.
*H01R 13/717* (2006.01)
*H01R 12/71* (2011.01)

(52) U.S. Cl.
CPC ....... *H01R 13/7175* (2013.01); *H01R 12/714* (2013.01)

(58) Field of Classification Search
CPC . H01R 12/714; H01R 13/7175; F21V 19/003; F21V 19/0035; F21V 19/004; F21V 19/0055
USPC ................. 362/640, 646, 647, 649, 657–659
See application file for complete search history.

(56) References Cited

U.S. PATENT DOCUMENTS 8,246,214 B2 * 8/2012 Huang ...................... F28F 7/00 362/373
2013/0084748 A1 4/2013 Zaderej et al.
2013/0265783 A1 * 10/2013 Wang ........................ F21K 9/20 362/374
2016/0312984 A1 10/2016 Poorter et al.
2022/0373164 A1 * 11/2022 Henrici ................... F21V 17/10
2024/0243538 A1 * 7/2024 Kohen ................... H01R 33/18

FOREIGN PATENT DOCUMENTS

CN 103016979 A 4/2013
CN 106704904 A 5/2017
DE 102008005823 A1 8/2009
DE 202009012000 U1 12/2010
DE 102017101809 A1 8/2018

(Continued)

*Primary Examiner* — Thomas M Sember
(74) *Attorney, Agent, or Firm* — Smartpat PLC

(57) ABSTRACT

A connection element establishes an electrical connection of an LED light module. The LED light module includes a circuit board which is provided with contact pads for the electrical supply of the LED. A substantially ring-shaped frame is designed to overlap the circuit board and to hold it mechanically to a mounting surface of a counter bearing. An outer ring and an inner ring arranged in the outer ring together form the frame. A contact arrangement is mounted in the frame and serves for the electrical supply of the LED. A connection contact in the outer ring serves to connect a connection lead as the first piece of the contact arrangement. A supply contact in the inner ring serves for electrically contacting a contact pad of the circuit board as the second piece of the contact arrangement. The connection contact and the supply contact are connected to each other.

10 Claims, 5 Drawing Sheets

(56) References Cited

FOREIGN PATENT DOCUMENTS

| | | | |
|---|---|---|---|
| DE | 202023105716 | U1 | 10/2023 |
| EP | 2083489 | A1 | 7/2009 |
| WO | 2012030536 | A2 | 3/2012 |
| WO | 2015008555 | A1 | 1/2015 |

* cited by examiner

TWO-PIECE LED CONNECTION ELEMENT

CROSS-REFERENCE TO RELATED APPLICATION

This application claims the benefit of German Patent Applications DE 20 2023 105 716.0, filed on Oct. 2, 2023, and DE 10 2024 104 504.3, filed on Feb. 19, 2024, which are hereby incorporated by reference in their entireties.

BACKGROUND

LED connection elements are known, for example, from EP 2 083 489 A1. They are used to mechanically arrange an LED light module—a circuit board with an LED arranged on it—on a counter bearing, primarily a heat sink. In addition, these LED connection elements provide a contact arrangement that serves on the one hand to connect connection leads and on the other hand to connect contact pads on the circuit board. In this way, the contact arrangement serves to supply electricity to the LED light module. Such LED connection elements combine both the mechanical fixing and the electrical contacting of the LED light module, thus simplifying the use of LED light modules in modern luminaires.

SUMMARY

The disclosure relates to a connection element for the electrical connection of an LED light module. The LED light module includes a circuit board which is provided with contact pads for the electrical supply of an LED. A substantially ring-shaped frame is designed to support the circuit board and to hold it mechanically to a mounting surface of a counter bearing. An outer ring and an inner ring, arranged in the outer ring, together form the frame. A contact arrangement is mounted in the frame and serves for the electrical supply of the LED.

The applicant has published a newly developed LED connection element with the priority application DE 20 2023 105 716 U1. This is characterized in that the connection element is constructed in two pieces. An outer ring is designed to be fixed onto a heat sink and to precisely accommodate the LED circuit board within a mounting frame. An inner ring is inserted into the outer ring, which extends above the circuit board and thus secures it in the connection element. In addition, the inner ring applies a pressing force to the circuit board, so that it is pressed against the heat sink to optimize heat transfer. This is preferably achieved using spring elements.

The spring-loaded arrangement of the inner ring in the outer ring also makes it possible to compensate for unavoidable tolerances in the circuit board thickness. The inner ring is arranged to a certain extent in a position-tolerant manner in the light exit direction of the LED or in the vertical direction to the counter bearing or its mounting surface for the LED. For the details in this regard, reference is made to DE 20 2023 105 716 U1, which is incorporated by reference in its entirety.

The aforementioned publication discloses two different embodiments of the two-piece connection element. In a first embodiment, the inner ring is inserted vertically into the outer ring in the direction of the counter bearing and then rotated relative to the outer ring. The inner ring is fixed in the outer ring in the manner of a bayonet lock.

The second embodiment is limited to inserting the inner ring vertically into the outer ring, wherein latching projections of the inner ring are overlapped by latching springs of the outer ring.

The present disclosure provides a contact arrangement which ensures the electrical supply of the LED light module even in the case of a two-piece connection element.

This is achieved by a connection element with a contact arrangement which includes a connection contact in the outer ring for, in particular, solder-free connection of a connection lead as the first piece of the contact arrangement. A supply contact in the inner ring for electrically contacting a contact pad of the circuit board forms a second piece of the contact arrangement. The connection contact and the supply contact are connected to each other.

The design makes use of the division of the connection element into outer ring and inner ring in order to also separate the contact arrangement, which in the prior art is one-piece, into a connection contact and a supply contact. The connection contact located in the outer ring is primarily used to connect to the external connection lead and can therefore be designed for exactly this purpose in terms of its geometry, metal alloy and contact plating.

The supply contact located in the inner ring is primarily designed to contact the associated contact pad of the circuit board in the correct position and can be designed in its geometry, in its contact forces and in its contact plating to create an optimal electrical connection between the supply contact and the contact pad of the circuit board.

When the inner ring is inserted into the outer ring, this assembly process connects the connection contact and the supply contact to each other, so that the electricity supply to the LED light module is established.

It is therefore particularly provided that the connection contact forms a contact surface, the supply contact forms a counter-contact surface and the contact surface and the counter-contact surface rest directly against one another.

Particularly preferred is an embodiment in which the connection contact forms a contact arm which extends into a region of the frame overlapped by the inner ring and forms the contact surface for the supply contact in this region.

This design ensures a particularly simple connection of the connection contact and the supply contact, since the mutual contact surfaces face each other and are exposed when the inner ring is inserted into the outer ring opposite to the light exit direction. Inserting the inner ring into the outer ring causes the contact surface of the connection contact intended for the connection of the supply contact to be covered by the inner ring, thus ensuring the required touch protection.

Specifically, it is intended that the supply contact is designed as a contact bridge which spans the area between the contact surface of the connection contact and the contact pad of the circuit board.

It is specifically provided that the supply contact has a first contact leg, which forms the counter-contact surface for contacting the connection contact, and the supply contact has a second contact leg, which is intended to rest on the contact pad of the circuit board.

The first contact leg is deflected resiliently in the direction of the contact pad of the connection contact and the second contact leg is deflected resiliently in the direction of the contact pad of the printed circuit board.

The spring return elasticity of the contact legs of the supply contact ensures that there are sufficiently high contact forces both between the connection contact and the supply contact and between the supply contact and the contact pads of the circuit board to establish a secure electrical connection. In addition, the spring return elasticity of the contact legs can also be helpful in compensating for circuit board tolerances in terms of thickness without restrictions while maintaining consistent contact quality.

Particularly preferred is an embodiment in which the supply contact has a geometric pivot axis which is arranged parallel to the mounting surface of the counter bearing and the supply contact is arranged in the inner ring so as to be pivotable about this pivot axis.

The main advantage of this design is that the supply contact is arranged to be movable around the pivot axis and can thus swing. It is arranged on the inner ring like a balance beam or a rocker. The pivot axis is aligned parallel to the mounting surface of the counter bearing or parallel to that surface of the printed circuit board on which the LED is arranged.

The swing suspension of the supply contact makes it possible to compensate for thickness tolerances of the printed circuit boards even better than if only the spring elasticity of the contact arms is used. In addition, the swing suspension of the supply contact also compensates for the increased or reduced spring forces on the side of the contact leg of the supply contact resting on the contact pad of the circuit board by distributing the force between both contact legs. In this way, sufficient but not too strong contact pressure of the contact legs on their corresponding contact surface is ensured.

It is also possible for the pivot axis to be arranged eccentrically with respect to the distance between the contact surface of the connection contact and the contact pad of the circuit board.

The off-center arrangement of the pivot axis can be used to fine-tune the contact pressure of the supply contact on both the circuit board and the connection contact. In particular, the pressing forces can be increased or decreased by the off-center arrangement of the pivot axis in the direction of the circuit board or in the direction of the connection contact. In this way, it is possible, for example, to respond to special requirements of the coatings of the contact surfaces and thus not only to determine an optimal contact pressure with regard to an optimal electrical transition, but also to ensure a wear-reducing distribution of the pressing forces.

Specifically, it is provided that the inner ring forms a retaining pin for arranging the supply contact, the supply contact forms a retaining opening for the retaining pin, and the retaining pin reaches through the retaining opening for anchoring the supply contact.

Such a retaining pin is particularly easy to produce in the injection molding process. The supply contact can also be mounted particularly easily on such a retaining pin. In this case, the retaining pin is directed completely vertically to the mounting surface of the counter bearing or parallel to the light exit direction of the LED. Nevertheless, by appropriately designing the connection to the supply contact, this pin makes it possible to provide a geometric pivot axis which is arranged parallel to the mounting surface of the counter bearing.

In order to ensure a defined movement of the supply contact about its pivot axis, it is provided that the inner ring forms at least one guide web which rests against an edge of the supply contact and prevents rotation of the supply contact about the retaining pin.

The following description of an exemplary embodiment of the invention shows further features and further advantages.

DETAILED DESCRIPTION

Figure 1:
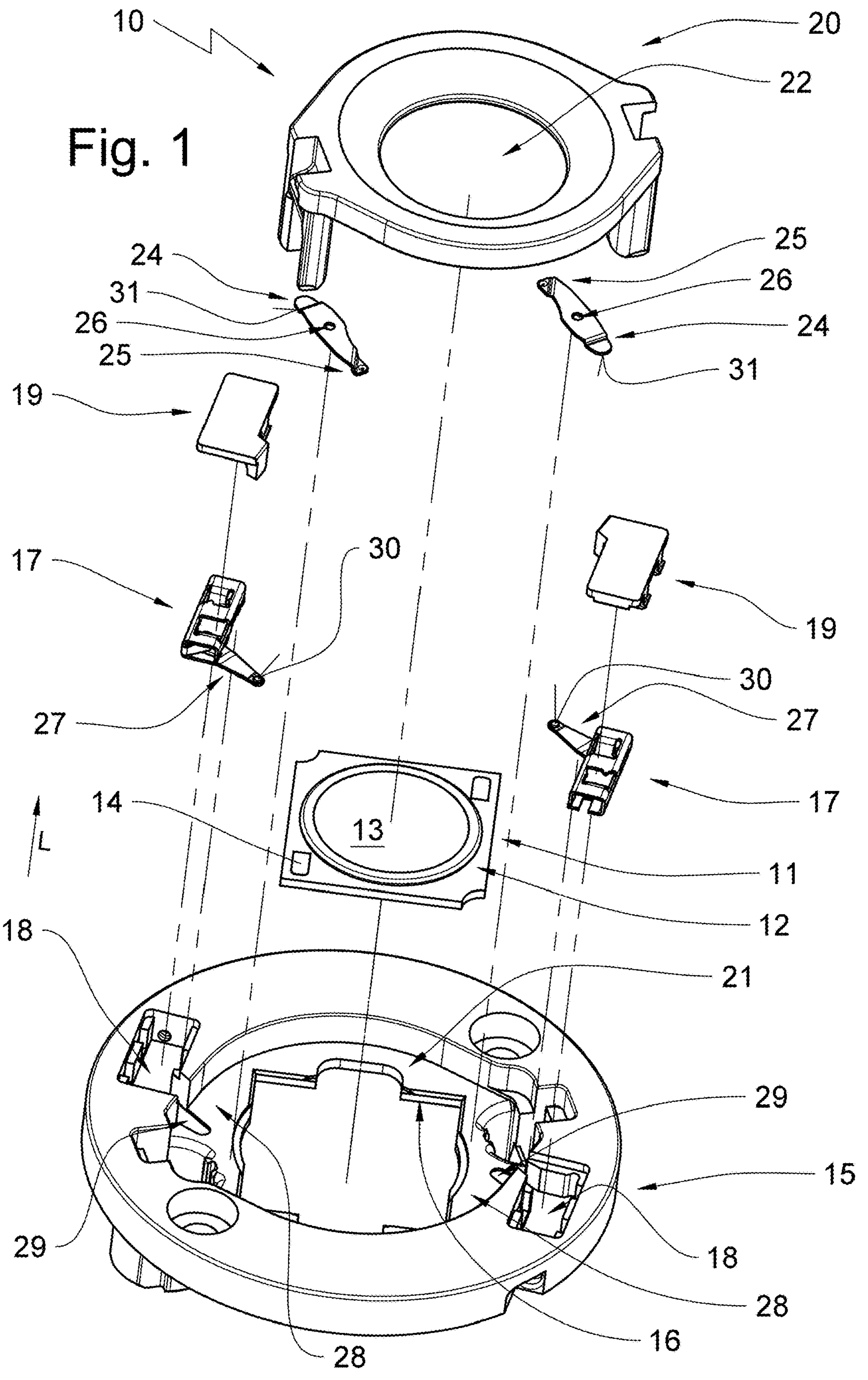
FIG. 1 is an exploded view of a connection element.

In the figures, a connection element is designated as a whole by the reference number 10.

The connection element 10 is used to arrange an LED light module 11 on the mounting surface A (FIGS. 4 and 5) of a heat sink (not shown). This mounting surface A extends parallel to the underside of a printed circuit board 12. The printed circuit board 12 carries an LED 13 and contact pads 14 on its upper side and is part of the light module 11.

The connection element 10 comprises an outer ring 15, the underside of which, facing away from the light exit direction L of the LED 13, is likewise seated on the mounting surface A of the counter bearing (not shown). The outer ring 15 forms a frame 16 for receiving the printed circuit board 12, by which the printed circuit board 12 is held in the direction parallel to the mounting surface A.

The outer ring 15 carries connection contacts 17, which are arranged in contact receptacles 18 of the outer ring 15. Each contact receptacle 18 is closed by a cover 19 to the top of the outer ring 15, so that the connection contacts 17, insofar as they are seated in the contact receptacle 18, are arranged in a touch-protected manner.

The connection element 10 comprises an inner ring 20, which is inserted into a receiving space 21 formed by the outer ring 15. When assembled, the inner ring 20 overlaps the circuit board 12, but allows light emission of the LED module 11 via its central light exit opening 22, which surrounds the LED 13. The inner ring 20 also carries the supply contacts 23.

Each supply contact 23 has a first contact leg 24 and a second contact leg 25. Between the contact legs 24, 25, the supply contact 23 includes a retaining opening 26.

Each connection contact 17 has a contact arm 27. When the connection contact 17 is seated in the contact receptacle 18 assigned to it, the contact arm 27 emerges from the contact receptacle 18 and engages in the receiving space 21, which is formed by the outer ring 15 for receiving the inner ring 20. In the exemplary embodiment, an insert contour 29 is formed in a bottom section 28 of the outer ring 15. The insert contour 29 serves to receive the contact arm 27 emerging from the receiving space 21. The insert contour 29 is advantageous, but may also be omitted.

Each contact arm 27 forms a contact surface 30 pointing in the direction of the inner ring 20, which is intended to connect to a counter contact surface 31 of the first contact leg 24 of the supply contact 23.

Figure 2:
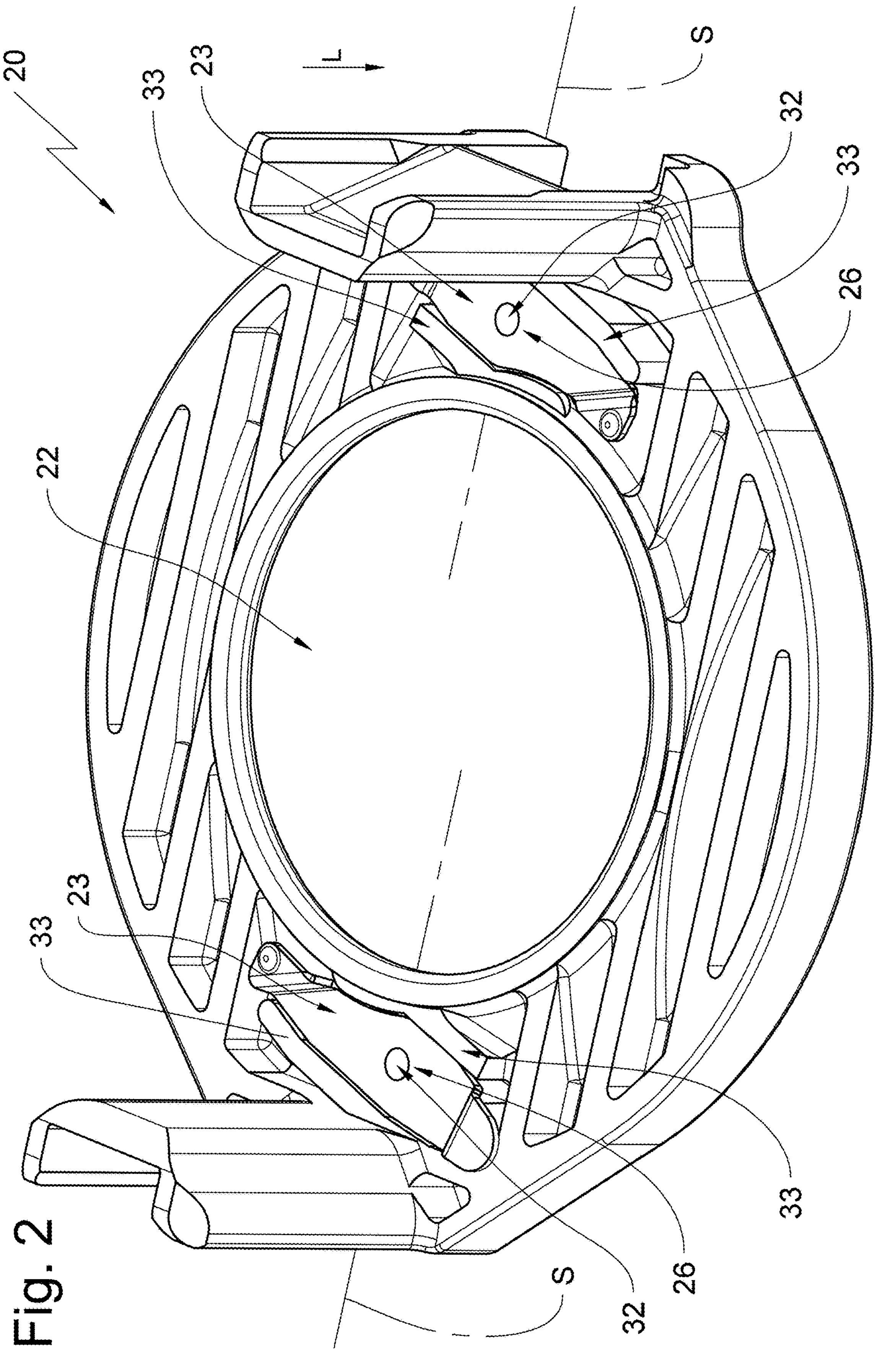
FIG. 2 is a bottom view of the inner ring of the connection element according to FIG. 1.

FIG. 2 shows a view of the underside of the inner ring 20. On both sides of the light exit opening 22, retaining pins 32 are formed by the inner ring 20. Each retaining pin 32 is directed approximately parallel to the light exit direction L or perpendicular to the mounting surface A of the counter bearing (not shown) and holds a supply contact 23. For this purpose, the respective retaining pin 32 passes through the retaining opening 26 of the supply contact 23. To prevent the supply contact 23 from slipping off the retaining pin 32, the retaining pin 32 is deformed into a mushroom head at its free end after the insertion of the supply contact 23. Two guide webs 33 are formed on the inner ring 20 at the sides of each supply contact. In each case, two guide webs 33 receive a supply contact 23 between them. In this way, the guide webs 33 prevent the supply contact from being able to rotate around the longitudinal axis of the retaining pin 32.

The supply contact 23 is held on each retaining pin 32 with a certain amount of play, so that each supply contact 23—guided by the guide webs 33—can swing about a pivot axis S. As shown in FIG. 2, the pivot axis S extends parallel to the mounting surface A for the printed circuit board 12, so that the supply contact 23 can swing in the manner of a rocker or a balance beam.

Figure 3:
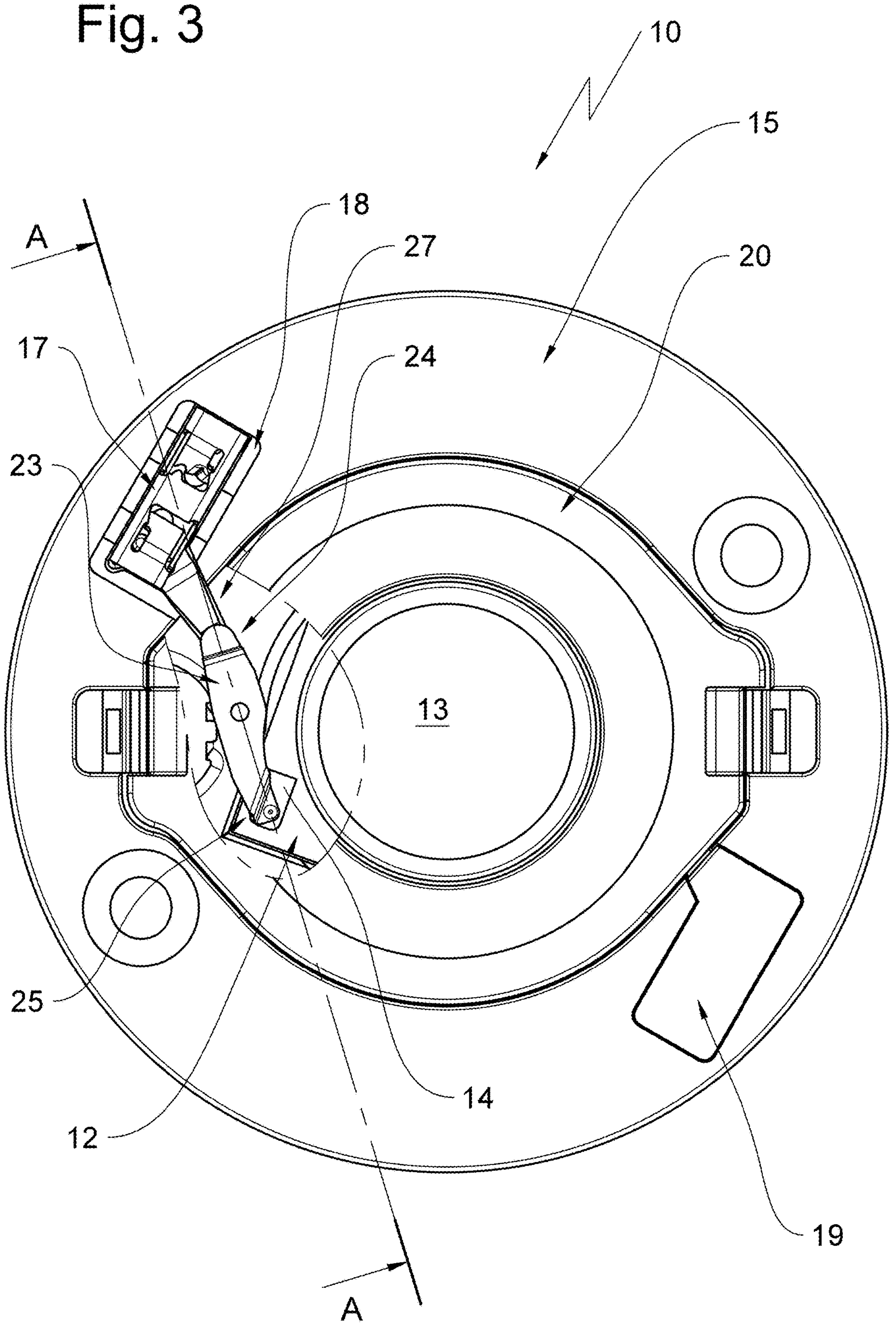
FIG. 3 is a top view of the connection element according to FIG. 2.

FIG. 3 shows a top view of the assembled connection element 10 according to FIG. 1, including the LED light module 11. The inner ring 20 is seated in the outer ring 15. The light exit opening 22 of the inner ring 20 surrounds the LED 13, so that the light emitted by the LED 13 can exit unhindered. The covers 19 close the contact receptacle 18 to the top of the connection element 10.

Figure 4:
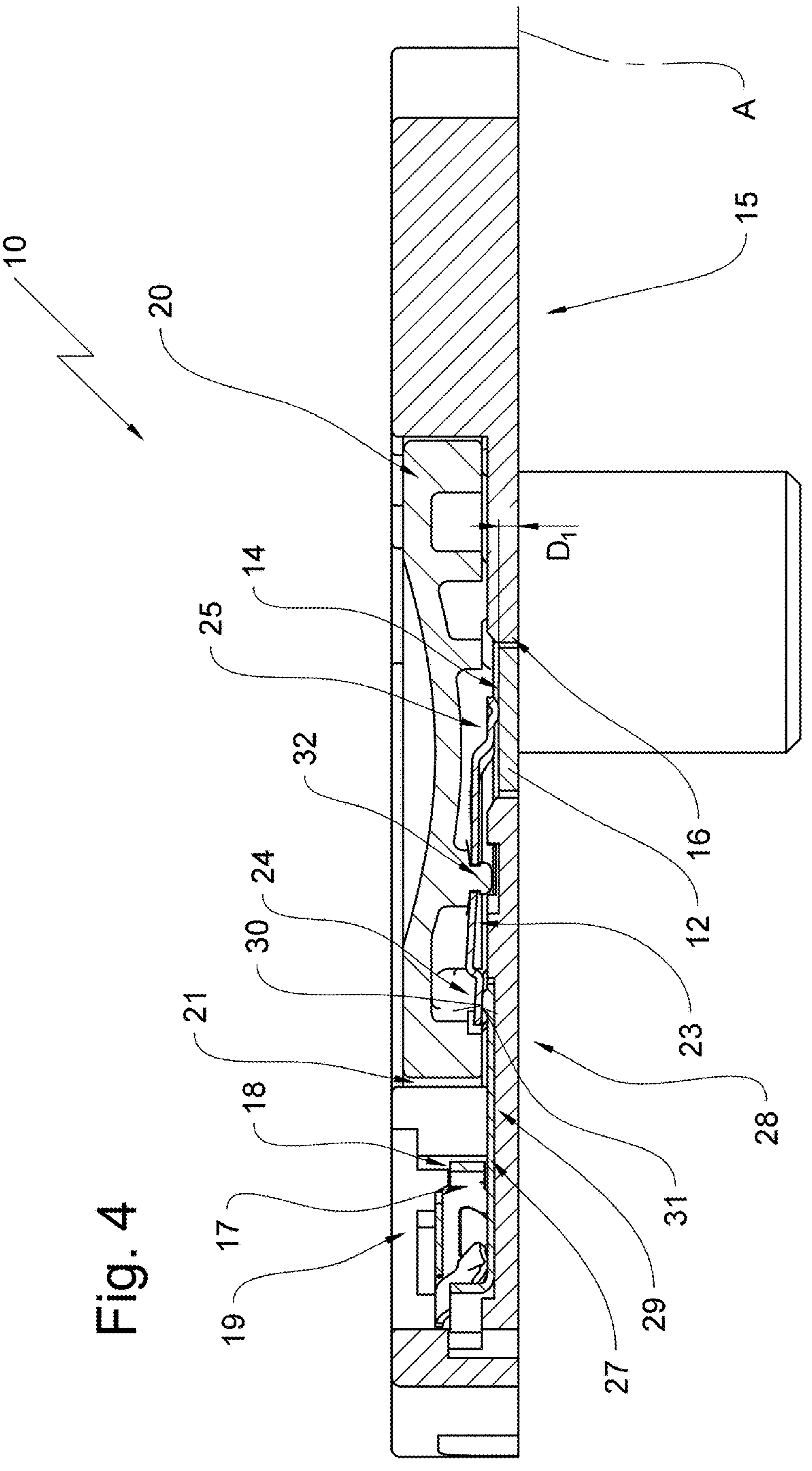
FIG. 4 is a first sectional view along section line A-A in FIG. 3.

FIG. 4 is a sectional view along section line A-A in FIG. 3. This section line extends longitudinally through the supply contact 23. FIG. 4 so shows a sectional view along the longitudinal axis of the supply contact 23. Only a small section of the printed circuit board 12 is shown, namely that corner in which a contact pad 14 is arranged.

As shown in FIG. 4, the illustrated connection contact 17 is seated in its contact receptacle 18, which is closed at the top by a cover 19. The contact arm 27 extends out of the contact receptacle 18 into the receiving space 21 for the inner ring 20. It lies in the insert contour 29, which is formed by the bottom section 28 of the outer ring 15. The contact arm 27 lies in a region of the receiving space 21 overlapped by the inner ring 20.

The inner ring 20 is seated in the receiving space 21 and carries the supply contact 23—fixed to the retaining pin 32. The supply contact 23 is designed as a contact bridge and spans the area between the contact surface 30 of the contact arm 27 and the contact pad 14 of the circuit board 12.

The supply contact 23 rests with the counter-contact surface 31 of its first contact leg 24 on the contact surface 30 of the contact arm 27 of the connection contact 17. The second contact leg 25 rests with its free end on the contact pad 14 of the circuit board 12.

If a connection lead for the electrical supply of the LED 13 is now attached to the connection contact 17, electricity is passed on to the circuit board 12 via the coupling of the connection contact 17 to the supply contact 23. The connection lead may be one wire of a cable for supplying electric power.

FIG. 4 shows a printed circuit board 12 which has a thickness D1 vertically to the mounting surface A—indicated by the dashed line. In the drawing, the printed circuit board 12 with the thickness D1 is lower in its height measured vertically to the mounting surface A than the bottom thickness of the outer ring 15.

Figure 5:
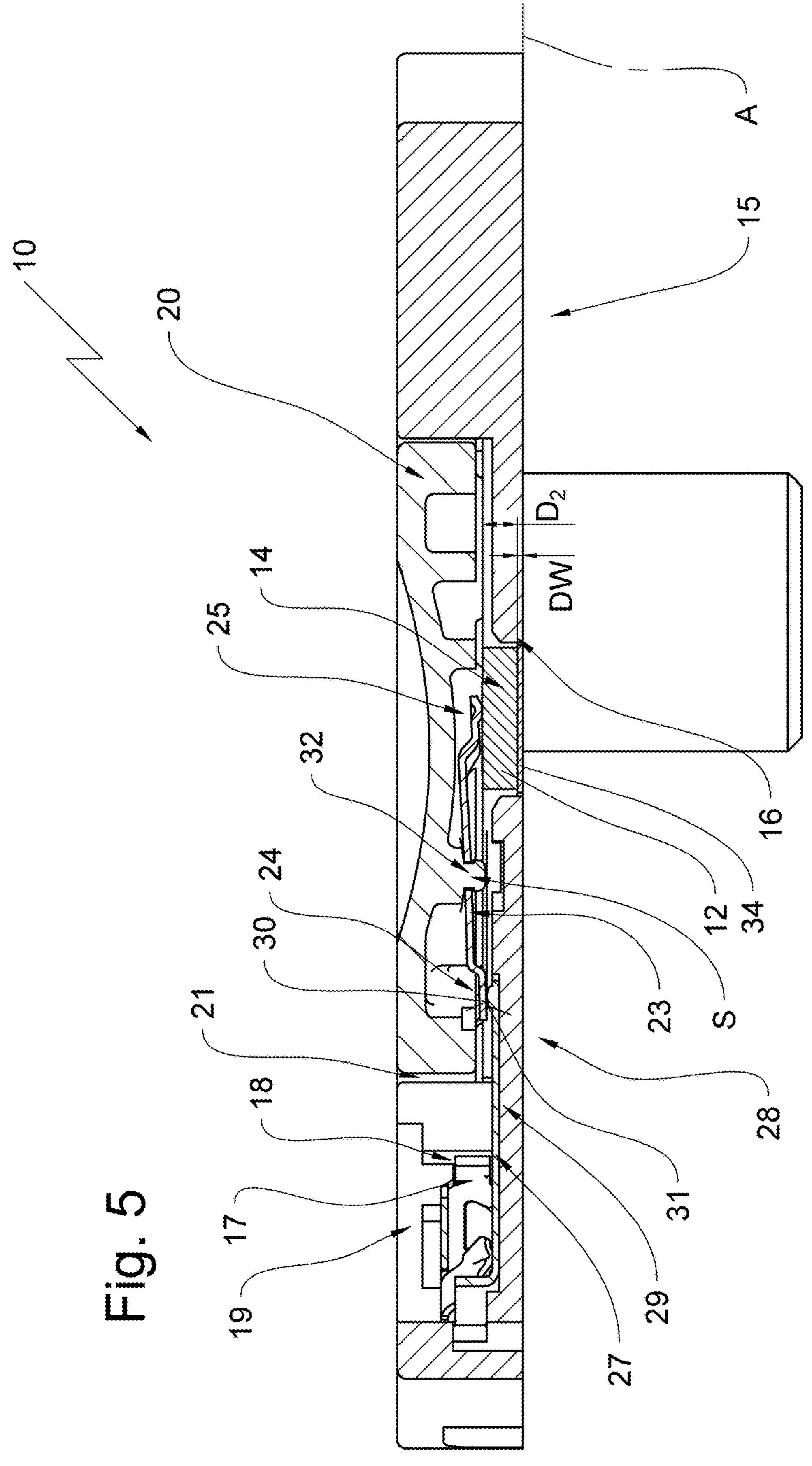
FIG. 5 is a second sectional view along section line A-A in FIG. 3.

FIG. 4 shows essentially the same facts as FIG. 5. In this respect, reference is made to the description there.

Particular attention is to be paid to the circuit board 12 in FIG. 5. This is thicker than the circuit board 12 in FIG. 4 and has a thickness D2. In addition, a heat conducting element 34 is arranged below the circuit board. The heat conducting element 34 is located between the underside of the circuit board 12 and the mounting surface A of the counter bearing or heat sink. The heat conducting element 34 serves to optimize the heat transfer from the circuit board 12 to the heat sink. In addition to the thickness D2, the thickness DW of the heat conducting element 34 is also added.

As a result, the inner ring 20 overlapping the circuit board 12 is seated less deeply in the receiving space 21 of the outer ring 15.

In FIG. 4 the second contact leg 25 is arranged lower with respect to the mounting surface A than the first contact leg 24 of the supply contact 23. The situation is different in FIG. 5. Here, the second contact leg 25 is arranged higher with respect to the mounting surface A than the first contact leg 24. This is made possible by the swing suspension of the supply contact 23, which is suspended in the inner ring 20 swinging around the pivot axis S.

An advantage of the present design stems from the separation of the contact arrangement known from the prior art into a connection contact 17 and a supply contact 23. This allows for a simple installation of the inner ring 20 in the outer ring 15 and a simple arrangement of the printed circuit board 12 in the outer ring 15. In addition, the separation of the contact arrangement in connection contact 17 and supply contact 23 makes it possible to improve the tolerance compensation for the printed circuit board thickness. Due to the swing arrangement of the supply contact 17 in the inner ring 20, excessively high contact pressure, in particular between the supply contact 23 and the generally high-quality contact pad 14 of the circuit board 12, can be reliably avoided. Damage to the contact pad plating due to excessive pressing forces is thus reliably avoided, which increases the longevity of a luminaire using the connection element 10.

LIST OF REFERENCE SYMBOLS

10 Connection element
11 LED light module
12 circuit board
13 LED
14 Contact pad
15 Outer ring
16 Frame
17 Connection contact
18 Contact receptacle
19 Cover
20 Inner ring
21 Receiving space
22 Light exit opening
23 Supply contact
24 First contact leg
25 Second contact leg
26 Retaining opening
27 Contact arm
28 Bottom section
29 Insert contour
30 Contact surface
31 Counter contact surface
32 Retaining pins
33 Guide web
34 Heat conducting element
A mounting surface
DW Thickness
D1 Thickness
D2 Thickness
L Light emission direction
S Pivot axis

What is claimed is:

1. A connection element (10) for electrically connecting an LED light module (11), the LED light module (11)

including a circuit board (12) which is provided with contact pads (14) for electrical supply of an LED (13), the connection element (10) comprising:

a substantially ring-shaped frame (16) designed to overlap the circuit board (12) and to hold the circuit board (12) mechanically to a mounting surface (A) of a counter bearing, the substantially ring-shaped frame (16) including an outer ring (15); and an inner ring (20) arranged in the outer ring (15); and a contact arrangement mounted in the substantially ring-shaped frame (16) for the electrical supply of the LED (13), including a connection contact (17) in the outer ring (15) for connecting a connection lead, the connection contact (17) being a first piece of the contact arrangement, and a supply contact (23) in the inner ring (20) for electrically contacting a contact pad (14) of the circuit board (12), the supply contact (23) being a second piece of the contact arrangement, wherein the connection contact (17) and the supply contact (23) are connected to each other, wherein the supply contact (23) has a geometric pivot axis (S) which is arranged parallel to the mounting surface (A) of the counter bearing, and wherein the supply contact (23) is arranged in the inner ring (20) so as to be pivotable about this pivot axis (S).

2. The connection element (10) according to claim 1, wherein the connection contact (17) forms a contact surface (30), wherein the supply contact (23) forms a counter-contact surface (31), and wherein the contact surface (30) and the counter-contact surface (31) rest directly against one another.

3. The connection element (10) according to claim 2, wherein the connection contact (17) forms a contact arm (27) which extends into a region of the substantially ring-shaped frame (16) overlapped by the inner ring (20) and forms the contact surface (30) for the supply contact (23) in this region.

4. The connection element (10) according to claim 2, wherein the supply contact (23) is a contact bridge which spans an area between the contact surface (30) of the connection contact (17) and the contact pad (14) of the circuit board (12).

5. The connection element (10) according to claim 2, wherein the pivot axis (S) is arranged off-center with respect to a distance between the contact surface (30) of the connection contact (17) and the contact pad (14) of the circuit board (12).

6. A connection element (10) for electrically connecting an LED light module (11), the LED light module (11) including a circuit board (12) which is provided with contact pads (14) for electrical supply of an LED (13), the connection element (10) comprising:

a substantially ring-shaped frame (16) designed to overlap the circuit board (12) and to hold the circuit board (12) mechanically to a mounting surface (A) of a counter bearing, the substantially ring-shaped frame (16) including an outer ring (15); and an inner ring (20) arranged in the outer ring (15); and a contact arrangement mounted in the substantially ring-shaped frame (16) for the electrical supply of the LED (13), including a connection contact (17) in the outer ring (15) for connecting a connection lead, the connection contact (17) being a first piece of the contact arrangement, and a supply contact (23) in the inner ring (20) for electrically contacting a contact pad (14) of the circuit board (12), the supply contact (23) being a second piece of the contact arrangement, wherein the connection contact (17) and the supply contact (23) are connected to each other, wherein the connection contact (17) forms a contact surface (30), wherein the supply contact (23) forms a counter-contact surface (31), wherein the contact surface (30) and the counter-contact surface (31) rest directly against one another, wherein the supply contact (23) is a contact bridge which spans an area between the contact surface (30) of the connection contact (17) and the contact pad (14) of the circuit board (12), wherein the supply contact (23) has a first contact leg (24), which forms the counter-contact surface (31) for contacting the connection contact (17), and wherein the supply contact (23) has a second contact leg (25), which is configured to rest on the contact pad (14) of the circuit board (12).

7. The connection element (10) according to claim 6, wherein the first contact leg (24) is resiliently deflected towards the contact pad (14) of the connection contact (17), and wherein the second contact leg (25) is resiliently deflected towards the contact pad (14) of the circuit board (12).

8. The connection element (10) according to claim 6, wherein the supply contact (23) has a geometric pivot axis (S) which is arranged parallel to the mounting surface (A) of the counter bearing, and wherein the supply contact (23) is arranged in the inner ring (20) so as to be pivotable about this pivot axis (S).

9. A connection element (10) for electrically connecting an LED light module (11), the LED light module (11) including a circuit board (12) which is provided with contact pads (14) for electrical supply of an LED (13), the connection element (10) comprising:

a substantially ring-shaped frame (16) designed to overlap the circuit board (12) and to hold the circuit board (12) mechanically to a mounting surface (A) of a counter bearing, the substantially ring-shaped frame (16) including an outer ring (15); and an inner ring (20) arranged in the outer ring (15); and a contact arrangement mounted in the substantially ring-shaped frame (16) for the electrical supply of the LED (13), including a connection contact (17) in the outer ring (15) for connecting a connection lead, the connection contact (17) being a first piece of the contact arrangement, and a supply contact (23) in the inner ring (20) for electrically contacting a contact pad (14) of the circuit board (12), the supply contact (23) being a second piece of the contact arrangement, wherein the connection contact (17) and the supply contact (23) are connected to each other wherein the inner ring (20) forms a retaining pin (32) for arranging the supply contact (23), wherein the supply contact (23) forms a retaining opening (26) for the retaining pin (32), and wherein the retaining pin (32) reaches through the retaining opening (26) for anchoring the supply contact (23).

10. The connection element (10) according to claim 9, wherein the inner ring (20) includes at least one guide web (33) which rests against an edge of the supply contact (23) and prevents rotation of the supply contact (23) about the retaining pin (32).

* * * * *